United States Patent [19]

Gluntz

[11] Patent Number: 4,912,733

[45] Date of Patent: Mar. 27, 1990

[54] STEAM-WATER SEPARATING SYSTEM FOR BOILING WATER NUCLEAR REACTORS

[75] Inventor: Douglas M. Gluntz, San Jose, Calif.

[73] Assignee: General Electric Company, San Jose, Calif.

[21] Appl. No.: 328,849

[22] Filed: Mar. 27, 1989

[51] Int. Cl.⁴ .................. G21C 1/08; G21C 15/00
[52] U.S. Cl. .......................... 376/371; 376/377; 376/378
[58] Field of Search ........ 376/371, 370, 373, 377–379, 376/374, 375, 372

[56] References Cited

U.S. PATENT DOCUMENTS

| 3,253,999 | 5/1966 | Weisman | 376/371 |
| 3,338,791 | 8/1967 | Lass et al. | 376/371 |
| 4,696,792 | 9/1987 | Hobson | 376/377 |

FOREIGN PATENT DOCUMENTS 1089588  5/1986  Japan .............................. 326/371

Primary Examiner—Harvey E. Behrend
Attorney, Agent, or Firm—Robert R. Schroeder

[57] ABSTRACT

A steam separating system for boiling water nuclear reactors comprising a combination of mechanical steam separators with steam collecting and transferring units.

5 Claims, 2 Drawing Sheets

STEAM-WATER SEPARATING SYSTEM FOR BOILING WATER NUCLEAR REACTORS

FIELD OF THE INVENTION

This invention relates to water cooled nuclear fission reactors of the so-called boiling water type. Boiling water nuclear reactors comprise a steam generating plant wherein reactor water coolant is circulated through a core of heat producing fissionable nuclear fuel to transfer thermal energy from the fuel to the coolant, thereby generating a two-phase steam-water mixture at the core. Using steam-water separators and steam dryers positioned downstream from the core, the mixture becomes partitioned into its respective phases whereupon the steam is piped from the reactor for use in steam driven turbines and other equipment.

BACKGROUND OF THE INVENTION

In typical boiling water reactors used for power generating operations, reactor coolant is circulated endlessly around a flow path comprised of a core entrance plenum located below the heat producing fuel core, thence through the core itself, thence through an upper plenum region located above the core and which serves to collect all the coolant passing through fuel assemblies comprising the core, then on through an assembly of steam separators overhead of the core upper plenum, and finally back downward outside the core, along a region termed the downcomer annulus, to return to the core lower plenum. If the reactor is designed as a natural circulation type boiling water reactor, this final flow path outside the core is direct and uninterrupted. A cylindrical member enshrouding the core and extending some distance both above and below the elevations containing the core is positioned between upwardly flowing coolant passing through the reactor core, and downwardly flowing coolant recycling back to the core lower plenum. If the reactor type is a forced circulation reactor, some form of pumping mechanisms are positioned outboard of the core shroud member along this portion of the flow path to amplify the pressure head otherwise present in the core lower plenum region.

The water coolant in such boiling water reactors during their power generating operation exists, at the core entrance, in the form of a subcooled liquid. This subcooled liquid has been produced by mixing, early along the downcomer annulus flow path, two streams: a feedwater stream that has large temperature subcooling relative to reactor operating pressure conditions, and a saturated liquid stream which has been derived by the partitioning, via the assembly of steam separators aided by steam dryers, of two-phase steam-water mixture produced at the exit from the core. The feedwater stream has a mass flow rate that is controlled to match the reactor steam output mass flow rate, so that the coolant inventory and water level within the reactor remain nominally constant. The aforementioned partitioned saturated liquid stream typically has a mass flow rate many times the mass flow rate of the feedwater stream, so that the temperature of the mixed stream arriving in the core lower plenum lies closer to the coolant saturated conditions than to the feedwater entrance conditions.

As the reactor coolant passes through the core, heat is transferred from the fuel assemblies to the coolant. The water coolant emerges from the heat producing fuel core as a two-phase mixture of steam and water, the proportions of which vary depending on such factors as the power output from the fuel, the amount of subcooling present in the feedwater, the total hydrodynamic flow resistance presented by the fuel core design and structure and its wetted surface, and the amount of orificing representing restrictions to flow immediately prior to the entrance of the coolant into the individual core fuel assemblies.

Conventional fuel assemblies of boiling water reactors are composed of a multiplicity of fuel units, such as rods, grouped together in bundles, with each bundle surrounded by an open ended channel for flow lengthwise therethrough. These channeled bundles of fuel units are spaced apart from each other to provide intermediate spaces for insertion of control blades. Thus, there are ample areas for coolant water bypass flow beyond close proximity to the heat producing fuel units within a bundle.

Bypass flow coolant water passes through the fuel core without closely encountering the high energy emanating from the fuel and enters the core upper plenum consisting substantially of saturated liquid with perhaps a small amount of steam. This bypass effluent joins the two-phase steam-water mixtures exiting from individual fuel assemblies comprising the core. These two effluents rapidly mix together within the core upper plenum losing identity from their origin, with the result of a combined overall steam-water mixture containing significant proportions of water.

Typical boiling water reactors utilize mechanical steam separators to separate steam from the steam-water mixture leaving the fuel core. Some early reactor designs employed free-surface steam separation means where steam separates unaided from the free-surface, and saturated water remains in the bulk coolant which is recirculated back around through the fuel core. This means of steam separation is feasible as long as the steam-leaving velocity—the bulk average velocity of the steam taken across the available pathway flow area—is no greater than about 1.8 feet per second. If steam-leaving velocities become greater than this limiting value, the steam tends to carry along an unacceptably high moisture content. The high moisture levels saturate the moisture-drying capability of the steam dryer whereby there is an excessively high moisture content in the steam leaving the reactor and supplied to a turbine or other steam utilizing mechanism. Such high moisture contents in steam tend to accelerate corrosion-/erosion of the turbine blades and other components.

Free-surface separation capabilities can be achieved if the reactor pressure vessel cross-sectional area is made large enough. Cost economics, however, often dictate that minimum diameter pressure vessel be used whereby mechanical steam separators have been developed and employed to handle the higher power output steam production levels of various current boiling water reactor designs. In these later reactor designs the steam bulk average velocity moving through the wet steam plenum region immediately downstream of the mechanical steam separators is about 5 feet per second.

The steam exit qualities tend to be higher from the central region of the fuel core than from the peripheral region of the fuel core. However, it is desirable that the flow rates and the steam-water mixture proportions entering the steam separator standpipes from the core upper plenum be relatively uniform. To facilitate achieving more uniform steam-water mixtures for entry into the standpipes of the steam-water separators above the fuel core and core upper plenum, the standpipe entrances typically are separated from the fuel assemblies by a distance of at least about 5 feet. Turbulent mixing occurring between the fluid plumes leaving adjacent fuel groups of the core, each with a different void content, comprises one mechanism acting to produce more uniform steam-water mixtures adjacent to the steam separator standpipe entrances. More significant with respect to achieving uniformity of flow mixture, is the hydrodynamic flow resistance represented by the standpipes each with their end-mounted steam separators. Complete flow mixture uniformity entering the steam separator standpipes is at best difficult to achieve and, even with a five foot separation between the fuel core assembly exits and the separator standpipe entrances, is not a design basis used for reactor performance evaluations.

A conventional boiling water reactor steam separator assembly consists of a domed or flat-head plate topping the core upper plenum which is superimposed over the fuel core. An array of steam separator standpipes are affixed such as by welding to the core upper plenum top plate with the standpipes in fluid communication with the interior of the core upper plenum. A mechanical steam separator, such as a three stage centrifugal axial flow separator, is mounted on the other and upper end of the standpipe affixed to the top plate.

One function of the standpipes is to provide a standoff separation of the larger-diameter steam separators, which are generally arranged in a relatively tightly compacted arrangement in which external diameters of adjacent separators are almost in contact with each other, whereby separated liquid coolant discharged from the bottom of the separator has a more open flowpath outward from the reactor longitudinal axis and out to the downcomer annulus region which lies at the inboard periphery of the reactor pressure vessel. A second reason for the standpipes on a high power output natural circulation reactor using mechanical steam separators is to provide a natural circulation "chimney" of two-phase (and thus low-density) coolant water wherein the chimney height provides part of the natural-circulation driving head for coolant water flow circulation within the reactor.

The steam separator assembly is supported by a flange at the top of the core shroud. The flange joint between the steam separator assembly and the core shroud is a metal-to-metal contact and does not require a gasket or other sealing devices requiring service or replacement. Moreover, the fixed axial flow type steam separators are constructed of stainless steel and have no moving parts whereby they are maintenance free.

In each separator, the steam-water mixture rises up from the core upper plenum through the standpipe into the separator unit where it impinges upon helical vanes that give the steam-water mixture a spinning movement establishing a vortex whereby centrifugal forces separate the denser water from the steam in several successive stages. Steam leaves the separator at the top and then passes out into the wet steam plenum located immediately below the steam dryer.

The separator water exits from the lower end of each stage of the separator and enters the underlying pool that surrounds the standpipes joining the downcomer annulus flow of reactor subcooled coolant. The steam exits from the separators can either be all in the same horizontal plane, or the separator units can be arranged with their tops in a convex crown with a higher center to compensate for a convex crowned water gradient to the underlying pool surrounding the standpipes.

The mechanical separator has certain principal performance requirements; namely, over a range of approximately 30 inches of water level variation about about the midplane of the separator units housing, and over a range of reactor power operating conditions from about 25% up to and slightly exceeding 100% the steam separator is required to deliver wet steam into the wet steam plenum with moisture contents generally not to exceed 10% by weight of the wet steam effluent, and to deliver water out the bottom of the stages of the unit stripped of steam to the extent that bulk average steam carryunder generally does not exceed 0.25% by weight of effluent.

The nominal volumetric envelope of the steam separator assembly is defined by the horizontal plane of its lower terminal that contacts the top of the core shroud, its peripheral sides that provide part of the five foot standoff from the fuel core assembly exits, the circumscribed diameter of the outermost row of the standpipes, and the generally horizontal plane of the exits to the steam separators.

At rated operated conditions with such mechanical steam separators the pressure drop from the core upper plenum to the wet steam plenum at the separator exit below the overhead steam dryer assembly is about 6.7 pounds per square inch of irreversible head losses (friction, form drag and exhaust losses).

Irreversible head losses anywhere along the reactor coolant circulation path are penalizing to the efficiency of operation of the reactor pressure vessel and/or the overall nuclear steam supply system. For natural circulation boiling water reactors, irreversible head loss means greater chimney height has to be provided, which means the reactor pressure vessel probably has to be made larger, namely taller, and therefore more costly. Also the reactor containment building and probably other components would need be made larger contributing to greater costs.

In forced circulation boiling water reactors irreversible head loss would require greater pumping power to accomplish core recirculation flow, and in turn greater capital and greater operational costs for the pumping system and thus poorer net plant heat rate.

SUMMARY OF THE INVENTION

This invention comprises an improved steamwater separating system for boiling water nuclear reactors. The invention includes a novel combination of conventional standpipes with mechanical steam separators and an open bottom steam collection chamber(s) located within the core upper plenum with a venting pipe extending to the wet steam plenum. The overall flow coefficient of said vent pipe, together with the reference flow area of the vent line, is such as to limit the steam throughput rate to less than a prescribed value. Steam accumulates in the open bottom collection chamber, separating itself from the two-phase steam-water mixture within the core upper plenum attributable to the phenomenon of freesurface separation. The vent flow-coefficient and vent-area combination lower limit is based upon the collection area of the steam collection chamber, and is such that the operating pressure differential across the vent line will pass steam only at rates required to maintain the process of steam collection in the open bottom collection chamber as a free-surface separation process.

OBJECTS OF THE INVENTION

It is a primary object of this invention to provide an improved steam-water separating system for boiling water nuclear reactors.

It is also an object of this invention to provide an improved configuration and means for boiling water nuclear reactors which yield reduced irreversible coolant water circulation flow losses within the reactor pressure vessel.

It is a further object of this invention to provide a boiling water nuclear reactor internal configuration or design which is more compact in size, or handles a greater volume of steam/water coolant in steam production.

It is an additional object of this invention to provide a boiling water nuclear reactor internal configuration or design which enables more effective steam production whereby overall construction and operation costs are reduced.

DETAILED DESCRIPTION OF THE INVENTION

This invention deals with an added device to the conventional boiling water reactor steam-water separating means which enhances the existing mechanical steam separation capability of the system.

Figure 1:
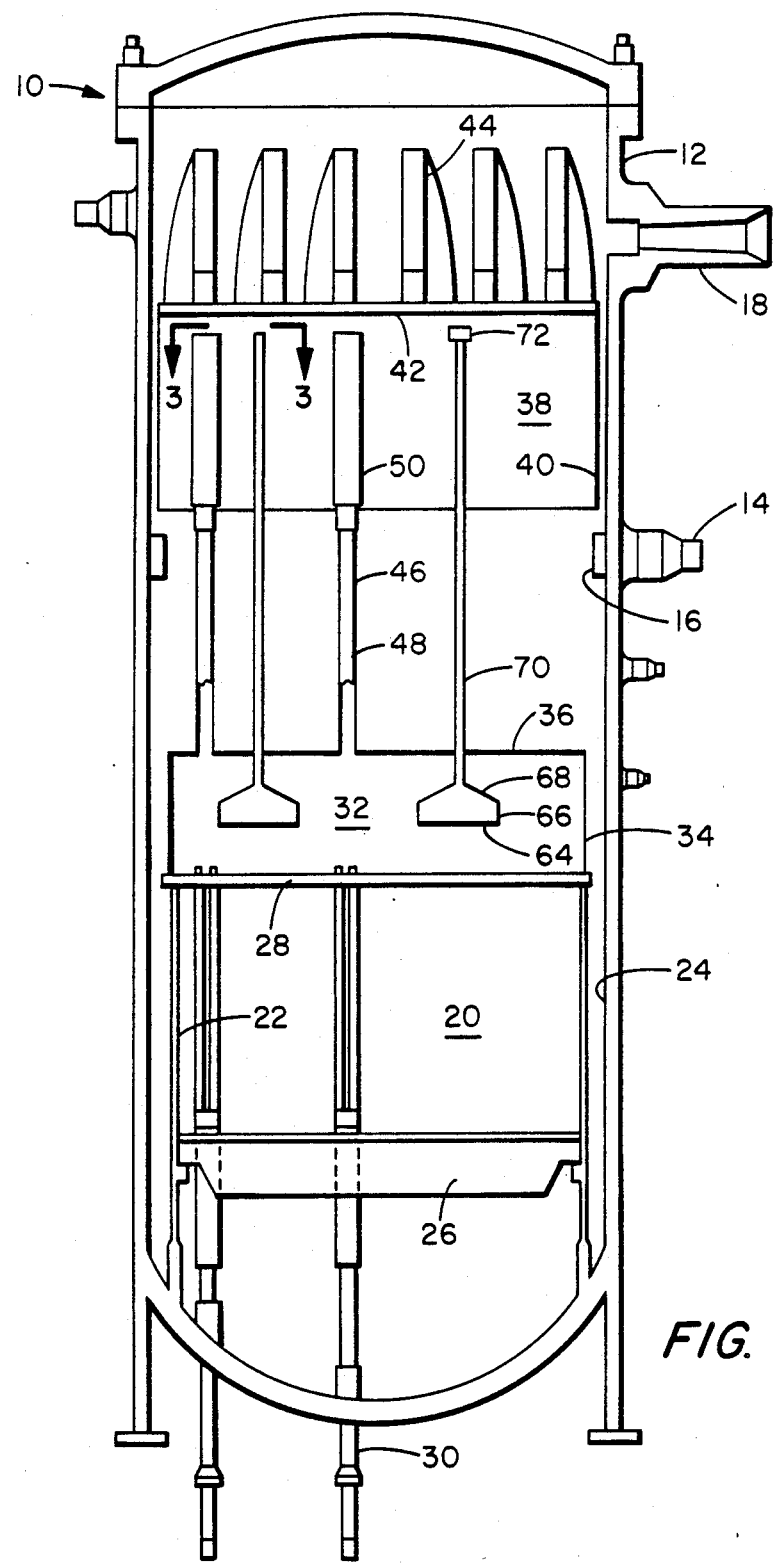
FIG. 1 comprises a vertical sectional view of a boiling water nuclear reactor pressure vessel with part in elevation.

Referring to the drawings, in particular FIG. 1, a boiling water nuclear fission reactor 10 comprises a reactor pressure vessel 12 having feed-water inlet 14 for the introduction of a portion of the recirculating coolant into the pressure vessel 12 through an annular distributor 16, and a steam outlet 18 for the discharge of generated steam for appropriate work.

A core of heat generating fissionable fuel 20 is located within the pressure vessel 12, generally intermediate its length and is surrounded by a shroud 22 spaced inward from the wall of the pressure vessel to provide an annular coolant flow path 24 intermediate the pressure vessel wall and the shroud 22 for the fuel core 20. The fuel core 20 is supported on an underlying core support plate 26 and the upper portion of the fuel units of the core 20 are held in position with top spacing grid plate 28. Control rods 30, which regulate the rate of the nuclear fission reaction of the fuel in the core 20, move upward into the arrayed fuel bundles of the core 20 and back downward out from the core.

Superimposed above the fuel core 20 and the top spacer grid plate 28, is an open area comprising the core upper plenum 32 defined by an annular shroud 34 and top plate 36. Shroud 34 is spaced inward from the wall of the pressure vessel to provide for the annular coolant flow path 24 intermediate the pressure vessel wall and the shroud 34 of the core upper plenum 32.

Spaced a distance above the fuel core 20 and the superimposed core upper plenum 32, is an area comprising the wet steam plenum 38 defined by a peripheral shroud 40 and a top plate 42. A steam dryer assembly 44 is superimposed above the wet steam plenum 38 and its top plate 42.

A multiplicity of mechanical steam-water separators 46 each comprising a standpipe 48 with a steam separator assembly 50 mounted on its upper end, are arranged in close proximity to each other within the area intermediate the core upper plenum 32 and the steam dryer assembly 44. The lower end of separator standpipe 48 are fixed to the top plate 36 of the core upper plenum 32, such as by welding. Each standpipe 48 is in fluid communication with the core upper plenum 32 whereby steam-water mixtures within the plenum area can enter the standpipes and rise up into the steam separator assembly 50 mounted thereon.

Figure 2:
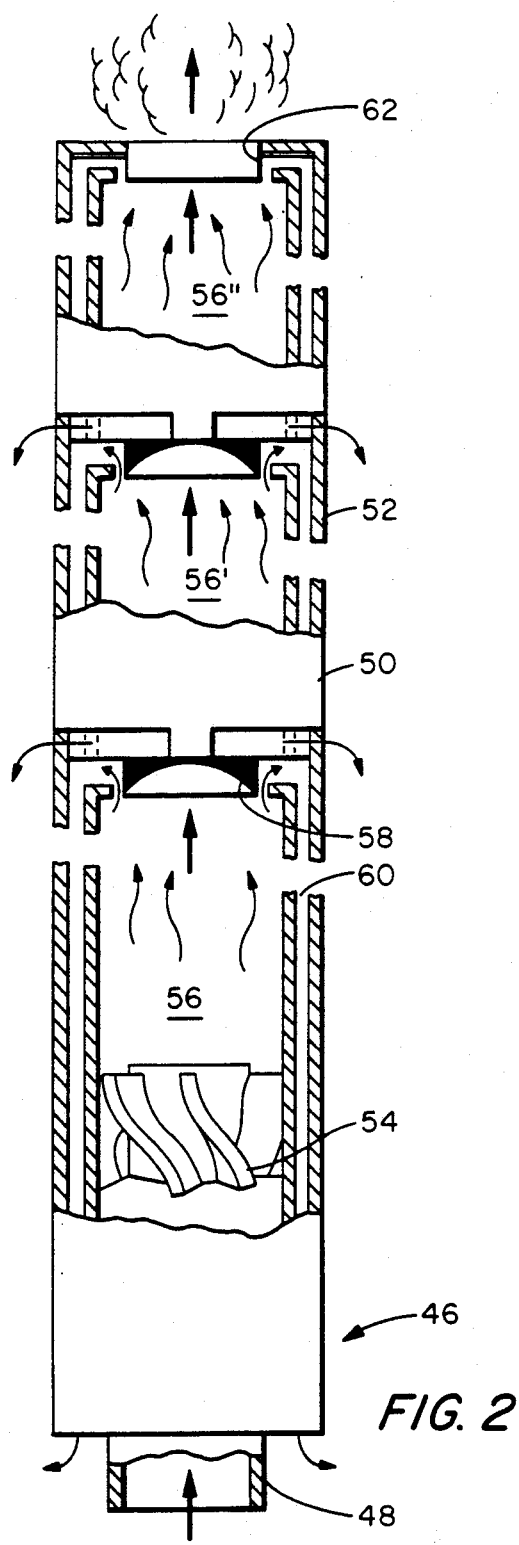
FIG. 2 is a detailed, enlarged sectional view, with parts in elevation, of a mechanical steam-water separator.

As shown in FIG. 2, steam separator assembly 50 comprises a cylindrical housing 52 positioned within the wet steam plenum 38 and secured to the upper end of each standpipe 48 for receiving the steam-water mixture through its standpipe 48 from the core upper plenum 32. A typical steam separator assembly 50 comprises helical vanes 54 in the base of the housing 52 adjoining the upper end of standpipe 48 to induce a swirling movement to the steam-water mixture rising up into the assembly 50 from its standpipe 48. The centrifugal effect of the swirling mixture causes the heavier liquid water to move laterally outward while the lighter gaseous steam continues its upward movement centrally through the assembly 50. The steam separator assembly housing 52 is also divided into several superimposed compartments 56 which are separated with convex diverters 58 and provided with side outlets 60 to facilitate the centrifugal separation and enable lateral as well as downward discharge of the liquid water. A top central steam outlet 62 is located in upper end of the housing 52 for discharge of the separated steam therefrom adjacent to the top plate 42 of the wet steam plenum 38.

As is apparent, feedwater coolant enters the pressure vessel 12 through inlet 14 and is distributed around the periphery of the vessel by the annular distributor 16 whereupon it becomes mixed with separated liquid water emersing through side outlets 60. The annular flow of recirculating coolant passes down around the reactor intermediate the vessel wall and the shrouds of the core upper plenum and fuel core to the area below the fuel core support plate 26. Recirculation coolant flow then travels upward through the heat generating core of fuel producing a mixture of steam and hot water which emerges into the core upper plenum 32. The steam-water mixture continues upward from this plenum through the standpipes 48 and into mechanical steam separators 50 where the separated water emerging through side outlets 60 is discharged downwardly for recycling through the system and the separated steam continues upward through the steam dryers and on to its designated service.

In accordance with this invention, one or more steam collecting and transferring units is combined with the steam-water assemblies 46 of the above described boiling water nuclear reactor system.

Figure 3:
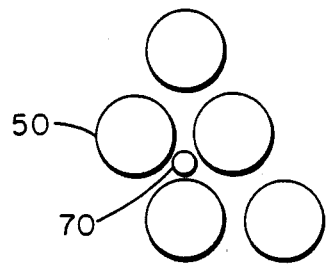
FIG. 3 is a transverse cross-sectional view taken along line 3—3 of the illustration of FIG. 1.

The steam collecting and transferring unit of this combination comprises an open bottom steam collecting chamber 64 located within the core upper plenum 32 to receive the steam-water mixture emanating from the fuel core 20. Steam collecting chamber 64 comprises side wall 66 of any apt cross-section such as cylindrical, and a top wall 68 which preferably is domed or conical shaped. The bottom of steam collecting chamber 64 is open to receive the upward flow of steam-water mixtures. Extending from the top, or apex of top wall 68 of chamber 64 is a vent pipe 70 which makes fluid contact with the interior of the open bottom chamber 64 and extends up into the wet steam plenum 38, intermediate the mechanical steam separators 50. The upper end of vent pipe 7 terminates for discharge, approximately in a plane with the top of the mechanical steam separators 50, or optionally in a higher plane above the steam separator 50. An additional option comprises a diffuser 72 on the upper exit end of the vent pipe 70 to enable the diameter of the vent line to be smaller while producing equivalent irreversible pressure drop at the same steam flow rates. FIG. 3 illustrates the arrangement of a vent pipe 70 in relation to the plurality of mechanical steam separators 50 within the wet steam plenum 38.

In operation, steam from the steam-water mixture emanating from the fuel core 20 into the core upper plenum 32, will separate by means of the free-surface steam separation phenomenon and collect in the open bottom steam collection chamber 64. As the steam collects within the chamber it will displace any saturated water, whereby the free-surface across which the steam separation action occurs will tend to be at the lowermost end of the steam collection chamber 64. As steam is collected within the steam collection chamber 64, it is vented through the vent pipe 70 into the wet steam plenum 38, being driven by the higher static pressure within the core upper plenum 32 relative to the static pressure in the wet steam plenum 38. The vent pipe 70 is sized relative to the open area of the steam collection chamber 64, whereby the volumetric flow rate of the steam through the vent pipe 70 is not greater than an amount corresponding to a bulk steam velocity crossing the open area of the steam collection chamber 64 of approximately 1.8 feet per second. This limit thus maintains the steam separation phenomenon as a free-surface process in which the moisture content is not excessive, as established by prior boiling water reactor operation designed for free surface separation of steam-water mixtures leaving the reactor chimney.

The steam mass flux (steam mass flow rate divided by flow-passage area) through the vent pipe 70 is significantly higher than the steam mass flux passing through the mechanical steam separator with helical vanes providing a vortex-type steam separation. This is based upon two factors. One, the full operating static pressure differential (considered about 7.6 pounds per square inch) is available to drive the steam, whereas for mechanical separators, the presence of the liquid component in the flow stream affects part of this available static pressure differential by hydrostatic pressure loss (considered to be about 0.9 pounds per square inch). Two, although the steam "slips"—moves at a higher velocity—relative to the liquid component moving up the standpipes, energy losses nevertheless occur as the slower moving liquid develops extra frictional drag on the steam.

Thus, the vent pipe diameter does not need to be as large as, for example, the standpipe diameter to still pass significant volumetric flow rates of steam. This establishes that the steam collection chamber can have a rather large open area, collecting steam at close to the 1.8 feet per second separation rate, and yet pass this steam into the wet steam plenum using a relatively small-diameter vent pipe.

Because large volumetric flow rates of steam can be vented from the core upper plenum into the wet steam plenum using one or more of the steam collecting and transferring units, the volumetric flow burden on the existing complement of mechanical steam separators is reduced. Due to this reduced volumetric burden, the overall irreversible pressure drop across the standpipes and separators assembly will be reduced. In effect, the combination of mechanical steam separator with the steam collecting chambers and vents, provides the result of a larger flow area. This advantage is achieved without detracting from the existing envelope within which the components reside within the reactor. Moreover, since the vent pipes are relatively minor additions within the array of mechanical steam separators, their presence will not have a significant effect upon the various processes underway within the mechanical steam separators.

Specifically, a salient aspect of this invention is its function of providing unique pathway(s) for wet steam to be vented into the wet steam plenum, thereby changing beneficially the mixture proportions of the balance of steam-water mixture entering the standpipes of the mechanical steam separators, without impairing the performance of the mechanical steam separators. Moreover, since the bulk flow quantities through the mechanical steam separators are reduced, and the steam quantities lowered, the two-phase flow multipliers are reduced in the standpipes and steam separators whereby the total steam separator assembly irreversible pressure drop is reduced.

What is claimed is:

1. A boiling water nuclear fission reactor having an improved steam-water separating system, comprising the combination of a reactor pressure vessel having an inlet for supplying feedwater and a steam outlet and containing a core of fissionable fuel for producing heat to generate steam, said fuel core being mounted between a discontinuous core support plate and a top spacing grid plate and surrounded by a shroud which is spaced inward away from the pressure vessel to provide an annular flow path outside the fuel core hereby supplied feedwater together with recirculated liquid coolant can flow downward around the exterior of the fuel core and then back upward through the fuel core for the transfer of thermal energy therefrom and generation of steam, a core upper plenum superimposed above the fuel core defined by a peripheral shroud covered with a top plate for receiving hot water and steam produced from reactor coolant passing up through the heat producing fuel core, a wet steam plenum defined by a peripheral shroud covered with a top plate positioned an extended distance above the core upper plenum, a multiplicity of mechanical steam separators each comprising a standpipe with an end in fluid contact with the core upper plenum and extending up from said core upper plenum top plate to the wet steam plenum and having a steam separating assembly mounted on its upper end within the wet steam plenum, and having at least one steam collecting and transferring unit positioned within the core upper plenum comprising an open bottom steam collecting chamber having a vent pipe extending up from the top of said chamber and passing through the core upper plenum top plate to the wet steam plenum for venting steam collected in the chamber from the core upper plenum into the wet steam plenum.

2. The boiling water nuclear fission reactor of claim 1, wherein a plurality of steam collecting and transferring units with their upward projecting vent pipes are interspaced among the multiplicity of mechanical steam separators within the wet steam plenum.

3. The boiling water nuclear fission reactor of claim 1, wherein the vent pipe from the steam collector and transferring unit is provided with a diffuser on its end within the wet steam plenum for reducing the exit stream velocity therefrom and for dispersing the steam discharged therefrom.

4. The boiling water nuclear fission reactor of claim 1, wherein the vent pipe from the steam collecting and transferring unit extends upward into the wet steam plenum above the top steam exit of the mechanical steam separators.

5. A boiling water nuclear fission reactor having an improved steam-water separating system, comprising the combination of a cylindrical reactor pressure vessel having an inlet for supplying feedwater and a steam outlet and containing a core of fissionable fuel for producing heat to generate steam, said fuel core being mounted between a discontinuous core support plate and a top spacing grid plate and surrounded by a shroud which is spaced inward among from the wall of the pressure vessel to provide an annular flow path outside the fuel core whereby supplied feedwater together with recirculated liquid coolant can flow downward around the exterior of the fuel core and then back upward through the fuel core for the transfer of thermal energy from the fuel of the core to the water and generation of steam, a core upper plenum superimposed above the fuel core defined by a peripheral shroud covered with a top plate for receiving hot water and steam produced from recirculated liquid coolant passing up through the heat producing fuel core, a wet steam plenum defined by a peripheral shroud covered with a top plate positioned an extended distance above the core upper plenum, a multiplicity of mechanical steam separators each comprising a standpipe with an end in fluid contact with the core upper plenum and extending up from said core upper plenum top plate to the wet steam plenum and having a steam separating assembly mounted on its upper end within the wet steam plenum, and a plurality of steam collecting an transferring units positioned within the core upper plenum comprising an open bottom steam collecting chamber having a side wall with a domed top and a vent pipe extending up from the top of said chamber and passing through the core upper plenum top plate to the wet steam plenum for collecting steam from the core upper plenum in the chamber and venting the steam into the wet steam plenum among the mechanical steam separators.

* * * * *